No. 616,621. Patented Dec. 27, 1898.
J. S. KEMP.
MANURE SPREADER.
(Application filed July 23, 1898.)
(No Model.) 2 Sheets—Sheet 1.
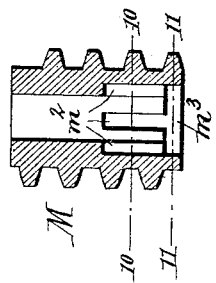
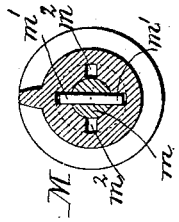
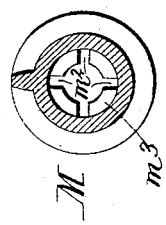
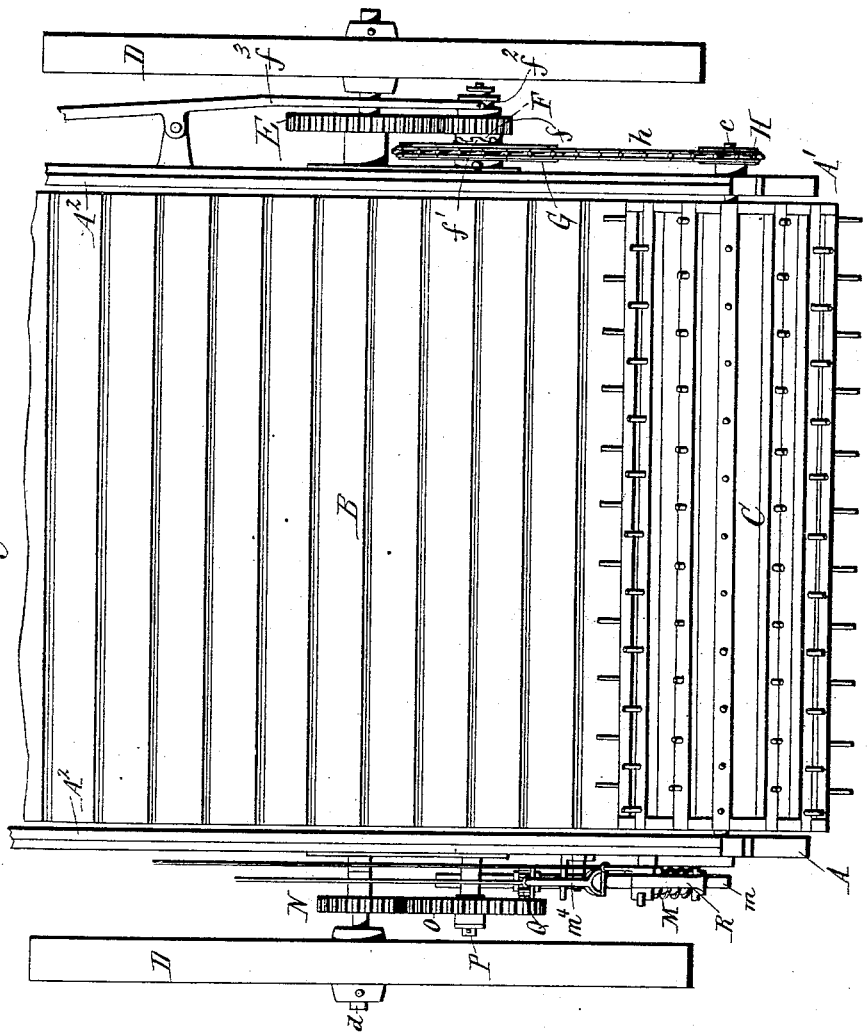
Witnesses:
Henry L. Dick
Chas. F. Burkhart.
J. S. Kemp, Inventor.
By Wilhelm & Bonner,
Attorneys.

No. 616,621. Patented Dec. 27, 1898.
J. S. KEMP.
MANURE SPREADER.
(Application filed July 23, 1898.)
(No Model.) 2 Sheets—Sheet 2.
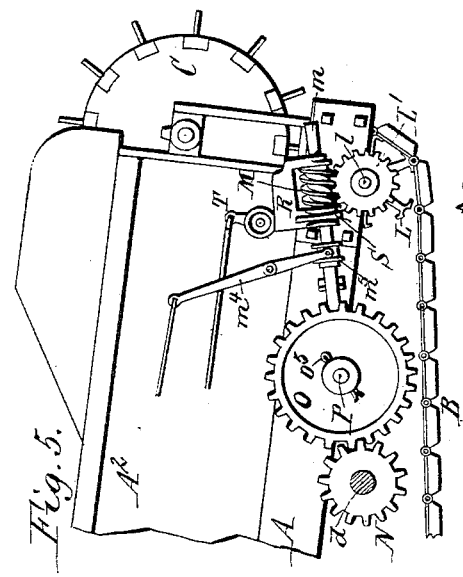
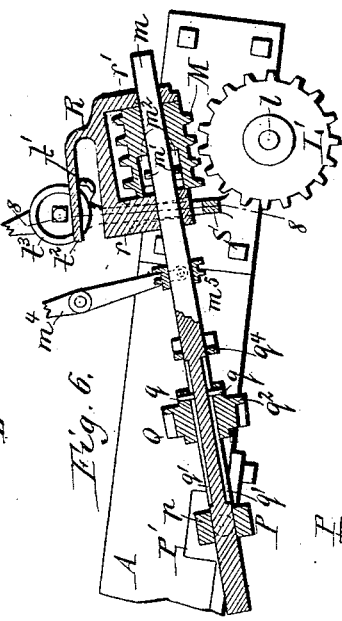
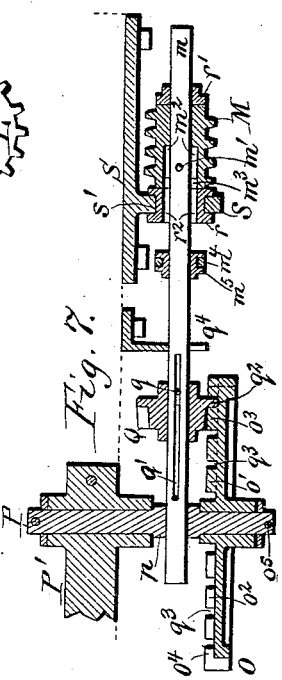
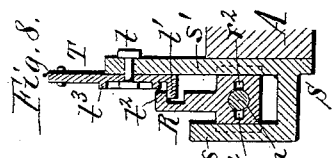
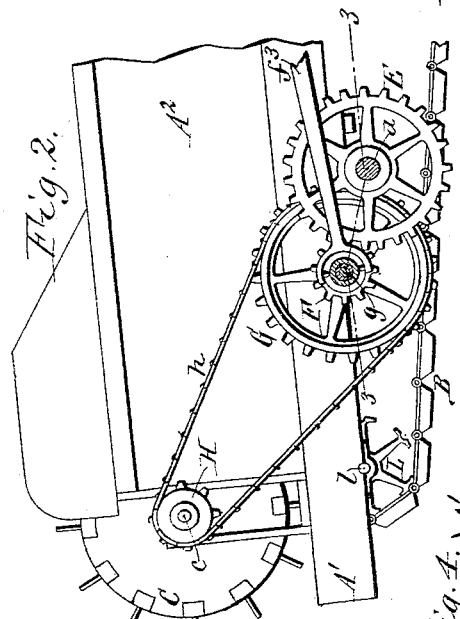
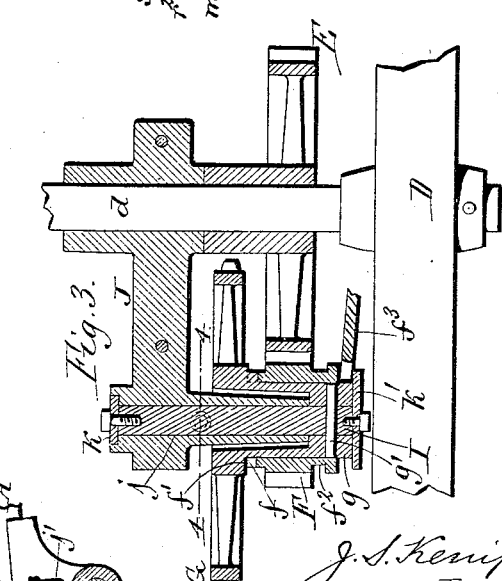
Henry L. Dick.
Chas. F. Burkhart. Witnesses.
J. S. Kemp,
Inventor.
By Wilhelm & Bonner
Attorneys.
THE NORRIS PETERS CO., PHOTO-LITHO., WASHINGTON, D. C.

UNITED STATES PATENT OFFICE.

JOSEPH SARGENT KEMP, OF SYRACUSE, NEW YORK.

MANURE-SPREADER.

SPECIFICATION forming part of Letters Patent No. 616,621, dated December 27, 1898.

Application filed July 23, 1898. Serial No. 686,648. (No model.)

*To all whom it may concern:*

Be it known that I, JOSEPH SARGENT KEMP, a citizen of the United States, and a resident of Syracuse, in the county of Onondaga, in the State of New York, have invented new and useful Improvements in Manure-Spreaders, of which the following is a specification.

This invention relates to that class of manure-spreaders which embody a box or body mounted on a wheeled frame and having a movable bottom or apron upon which the manure is slowly carried rearwardly to a toothed beater, which removes the manure from the rear end of the body or pile and throws it rearwardly from the machine.

My invention has the object to improve the mechanism by which the beater and the bottom are driven from the rear axle.

In the accompanying drawings, consisting of two sheets, Figure 1 is a top plan view of the rear portion of the machine. Fig. 2 is a side elevation, partly in section, of the rear portion of the machine, viewed from the right-hand side, on which the beater-driving mechanism is located. Fig. 3 is a horizontal section, on an enlarged scale, in line 3 3, Fig. 2. Fig. 4 is a vertical section in line 4 4, Fig. 3. Fig. 5 is a side elevation, partly in section, of the rear portion of the machine, viewed from the left-hand side, on which the bottom-driving mechanism is located. Fig. 6 is a longitudinal vertical section of the bottom-driving mechanism on an enlarged scale. Fig. 7 is a horizontal section of the same, taken in the plane of the worm-shaft. Fig. 8 is a vertical cross-section in line 8 8, Fig. 6. Fig. 9 is a detached longitudinal section of the worm on an enlarged scale. Figs. 10 and 11 are cross-sections of the worm in lines 10 10 and 11 11, Fig. 9, respectively.

Like letters of reference refer to like parts in the several figures.

A A' represent the side sills, and $A^2$ the side-boards of the wagon body or box; B, the movable bottom or apron, composed of transverse slats and connecting-links in the usual way; C, the beater, which may be cylindrical, as shown, or composed of toothed slats attached to belts; D, the rear wheels, and $d$ the rear axle, from which the beater and the bottom are driven.

The mechanism by which the beater is driven from the rear axle is arranged on the right-hand side of the machine, as represented in Figs. 1 to 4, and is constructed as follows: E represents the gear-wheel, which is secured to the rear axle $d$; F, the pinion which meshes with this wheel and which is connected by clutch-teeth $f f'$ with the sprocket-wheel G. The latter is connected with a sprocket-pinion H on the beater-shaft $c$ by a drive-chain $h$. The sprocket-wheel G is provided with an outwardly-projecting cup-shaped hub $g$, which is secured at its outer end by a pin $g'$ to the outer end of a counter-shaft I. The latter turns in a bearing $j$, which is formed on a frame J, secured to the under side of the adjacent sill A'. The bearing $j$ projects outwardly from this frame into the cavity of the hub $g$. The outer surface of the bearing and the inner surface of the cavity are preferably tapering, as shown. Caps or disks $k\ k'$ are secured, respectively, to the inner and outer ends of the counter-shaft I to prevent displacement of the latter. The outer surface of the hub $g$ of the sprocket-wheel is cylindrical, and the pinion F is mounted on the same, so as to be capable of sliding thereon toward and from the sprocket-wheel and so as to be capable of turning on the hub when the clutch-face $f$ of the pinion is disengaged from the clutch-face $f'$ of the sprocket-wheel. The outer end of the pinion is provided with an annular groove $f^2$, in which the shifting lever $f^3$ engages. The latter is of the usual construction and arrangement. An oil-cup $j'$, Fig. 4, is mounted on the bearing $j$ in rear of the sprocket-wheel to supply oil to this bearing and the counter-shaft I, journaled therein. This construction of the beater-driving mechanism is simple and durable and protects the counter-shaft and its bearing against dirt and enables their contact-surfaces to be kept thoroughly lubricated at all times.

The mechanism by which the movable bottom or apron is driven from the rear axle is arranged on the left-hand side of the machine, as represented in Figs. 1 and 5 to 11, and is constructed as follows: L represents the spider, which is arranged at the rear end of the machine and by which the bottom is driven.

$l$ represents the shaft to which this spider is secured, and L' the worm-wheel secured to this shaft on the left-hand side of the machine. M represents the worm which drives this worm-wheel, and $m$ the longitudinal shaft which carries this worm at its rear end. This worm-shaft is driven at its front end from the rear axle $d$ by a train of gear-wheels consisting of a spur-gear N, secured to the rear axle, a gear-wheel O, meshing therewith and mounted on an arbor P, one of a series of concentric gear-faces $o'$ $o^2$ $o^3$ $o^4$, formed on the rear side of the gear-wheel O, and a pinion Q, mounted on the rear portion of the worm-shaft. The gear-wheel O is mounted on the outer portion of the arbor P, so as to turn thereon, and the arbor is journaled in a bearing P', secured to the under side of the adjacent sill A', so as to be capable of rocking in said bearing. The rear portion of the worm-shaft $m$ is journaled in the arbor P between the gear-wheel O, and the bearing P', the arbor being provided between these parts with a perforated enlargement $p$, in which the worm-shaft can turn and also move lengthwise. The pinion Q is coupled with the worm-shaft by pins $q$, which are secured in the hub of the pinion and project into longitudinal grooves $q'$ in the shaft. The latter are so long that the pinion can be engaged with either of the gear-faces $o'$ $o^2$ $o^3$ $o^4$ on the rear side of the wheel O, as may be necessary to increase or reduce the rate of movement of the bottom. The gear-pinion Q is provided with a flange $q^2$, which projects into one of the grooves $q^3$ between the gear-faces $o'$ $o^2$ $o^3$ and holds the pinion against longitudinal movement on the worm-shaft. A fork $q^4$ is secured to the sill A' and straddles the worm-shaft beyond the outermost gear-face $o^4$ of the wheel O for holding the pinion Q against displacement when engaged with this outermost gear-face. The pinion is changed from one position to another by withdrawing the cotter-pin $o^5$ at the outer end of the arbor P and moving the gear-wheel O outward on the arbor until it clears the flange of the pinion, when the latter is shifted to the new position and the gear-wheel O pushed back into its operative position and secured by the cotter-pin. The worm M is coupled to its shaft $m$ by pins $m'$, which are secured to the shaft and project into longitudinal grooves $m^2$, formed in the worm. These grooves open at their front ends into an annular recess $m^3$. The worm-shaft can be shifted lengthwise by an adjusting-lever $m^4$, which engages with a grooved collar $m^5$ on the shaft. When the shaft is shifted to its forward position, in which the coupling-pins $m'$ project into the annular recess $m^3$, the worm is uncoupled from the shaft and the movement of the bottom is stopped. By shifting the shaft rearwardly, so that the coupling-pins engage in a pair of the grooves $m^2$ of the worm, the latter is coupled to the shaft. The motion of the latter is now transmitted to the worm and by the latter to the worm-wheel, and the bottom is now operated. In order to start and stop the bottom, it is only necessary to shift the worm-shaft backwardly or forwardly by the adjusting-lever, which latter is held in position by a suitable locking device—for instance, a notched segment. (Not shown.) The worm remains in gear with the worm-wheel whether it is coupled to its shaft or not, and the difficulties arising from lifting the worm out of gear every time it is desired to stop the bottom when not required to feed manure to the beater are avoided. I prefer to employ four coupling-grooves $m^2$ in the worm, so that the worm-shaft is required to make only a quarter of a revolution in order to bring its coupling-pins $m'$ into register with a pair of these grooves.

Occasionally it is desirable to move the bottom by the hand mechanism with which machines of this class are usually provided—for instance, for adjusting the follower toward the beater. In order to enable the spider-shaft to be turned by the hand mechanism, it is necessary to disconnect the worm from the worm-wheel. To that end the rear portion of the worm-shaft is journaled in a vertically-movable bifurcated bearing R, having a front jaw $r$ and a rear jaw $r'$. The worm is arranged between these two jaws and the shaft is journaled in the same. The front jaw $r$ of this bearing is arranged in a bifurcated upright guide S, which is secured to the outer side of the adjacent sill A in a position at right angles to the worm-shaft. The front jaw $r$ is provided in its front and rear sides with upright grooves, by which it straddles the front and rear parts $s$ $s'$ of the guide, so that it can move up and down on the same, and is held by the guide against movement in the direction of the worm-shaft. The thrust arising from the action of the worm on the worm-wheel is transmitted by the worm to the bearing R and by the front jaw $r$ of the latter to the guide S, so that the worm-shaft and its coupling-pins are relieved from this thrust, which would otherwise fall on the shaft and would compel the employment of a thrust-bearing for the shaft. The bearing R is moved vertically on the guide S by an adjusting-lever T, which is pivoted to the rear part $s'$ of the guide by a bolt $t$ and engages with its lower arm $t'$ under an overhanging flange $t^2$, formed on the rear side of the upper or web portion of the bearing R. The head at the outer end of the pivot-bolt $t$ is countersunk or protected by a circular flange $t^3$ on the lever, so that the bearing R can move freely up and down along the front face of the lever. By pulling the upper arm of the lever T forwardly the bearing R is raised, thereby lifting the worm clear of the worm-wheel, as shown in Fig. 6. Upon releasing the lever T the worm and bearing drop back into their operative position, which is shown in Fig. 5. The arbor P, in which the front portion of the worm-shaft is journaled, permits of this vertical movement of the worm-shaft, as this arbor is journaled in the bearing P'.

Except when the worm is disengaged from the worm-wheel for moving the bottom by the hand mechanism the bottom is always held in position by the engagement of the worm with the worm-wheel, whether the worm is coupled with the worm-shaft or not.

The front jaw $r$ of the bearing R is preferably provided with grooves $r^2$, Figs. 7 and 8, which permit the coupling-pins $m'$ of the worm-shaft to be passed rearwardly through the front jaw in inserting the worm-shaft into the bearing and worm in assembling the parts.

I claim as my invention—

1. The combination with the frame, the rear axle and the beater, of a journal-bearing which is secured to the frame between the rear axle and the beater and projects laterally therefrom, a counter-shaft journaled in said bearing to rotate therein and projecting beyond the outer end thereof, a driving-wheel for the beater having a hub which surrounds said bearing and is secured at its outer end to the outer end of said shaft, and gears and clutch-faces connecting said axle with said driving-wheel, substantially as set forth.

2. The combination with the rear axle and the beater, of a wheel whereby the beater is driven and which is provided with a clutch-face and with a cup-shaped hub projecting beyond said clutch-face, a rotary counter-shaft to the outer end of which the outer end of said hub is secured, a bearing which projects into the cavity of said hub and in which said shaft turns, a driving-pinion mounted on said hub and provided with a clutch-face adapted to engage the clutch-face of said wheel, and a wheel whereby the pinion is driven from the rear axle, substantially as set forth.

3. The combination with the movable bottom and the worm-wheel which is connected with the shaft by which the bottom is moved, of a worm meshing with said wheel, a worm-shaft, gear-wheels whereby the worm-shaft is driven and a releasable coupling device which is applied to the worm-shaft and whereby the movement of the worm and of the bottom can be stopped without disengaging the worm from the worm-wheel, substantially as set forth.

4. The combination with the movable bottom and the worm-wheel which is connected with the shaft by which the bottom is moved, of a worm meshing with said wheel, a worm-shaft, and a releasable coupling device connecting the worm with the worm-shaft and whereby the worm can be uncoupled from said shaft and the movement of the bottom can be stopped without disengaging the worm from the worm-wheel, substantially as set forth.

5. The combination with the movable bottom and the worm-wheel which is connected with the shaft by which the bottom is moved, of a worm meshing with said wheel and provided with a longitudinal coupling-groove and an annular uncoupling-recess, and a longitudinally-movable worm-shaft provided with a coupling projection adapted to be engaged in said groove for coupling the worm with the shaft and in said recess for uncoupling the worm, substantially as set forth.

6. The combination with the movable bottom and the worm-wheel which is connected with the shaft by which the bottom is moved, of a worm meshing with said wheel, a worm-shaft which is vertically movable toward and from said worm-wheel and also longitudinally movable, gear-wheels whereby said worm-shaft is driven, and a releasable coupling device which is shifted by the longitudinal movement of the worm-shaft and whereby the movement of the worm can be stopped without disengaging the worm from the worm-wheel, while the worm can be disengaged from the worm-wheel by the vertical movement of the worm-shaft, substantially as set forth.

7. The combination with the body of the machine, the movable bottom and the worm-wheel which is connected with the shaft by which the bottom is moved, of a worm, a worm-shaft connected with the worm by a releasable coupling device, a bearing in which said worm and said worm-shaft are confined and which receives the thrust of the worm, and a stationary guide secured to the body of the machine and receiving the thrust from said bearing, substantially as set forth.

8. The combination with the body of the machine, the movable bottom and the worm-wheel which is connected with the shaft by which the bottom is moved, of a worm, a longitudinally-movable worm-shaft, a releasable coupling device connecting the worm with the worm-shaft, a bearing which straddles the worm and in which the worm-shaft can turn and also move longitudinally, and a guide secured to the body of the machine and on which said bearing can move toward and from the worm-wheel, substantially as set forth.

9. The combination with the movable bottom and the worm-wheel which is connected with the shaft by which the bottom is moved, of a worm, a longitudinally-movable worm-shaft, a releasable coupling device, a vertically-movable bearing in which the worm-shaft is journaled adjacent to the worm, and a rocking arbor in which the opposite end of the worm-shaft is journaled and in which it is capable of lengthwise movement, substantially as set forth.

10. The combination with the body of the machine, the movable bottom and the worm which is connected with the shaft by which the bottom is moved, of a worm, a longitudinally-movable worm-shaft, a releasable coupling device connecting the worm with the worm-shaft, a vertically-movable bearing which receives the thrust of the worm, a guide secured to the body of the machine and receiving the thrust from said bearing, and a rocking arbor in which the opposite end of the worm-shaft is journaled and in which it is capable of lengthwise movement, substantially as set forth.

Witness my hand this 16th day of July, 1898.

JOSEPH SARGENT KEMP.

Witnesses:
 EDMOND P. NICHOLS,
 EMMA J. EVERSON.